United States Patent
Seo et al.

(10) Patent No.: US 9,269,971 B2
(45) Date of Patent: Feb. 23, 2016

(54) FLAT-TUBULAR SOLID OXIDE CELL STACK

(71) Applicant: KOREA INSTITUTE OF ENERGY RESEARCH, Daejeon (KR)

(72) Inventors: Doo-Won Seo, Daejeon (KR); Sun-Dong Kim, Daejeon (KR); In-Sub Han, Chungcheongnam-do (KR); Ji-Haeng Yu, Daejeon (KR); Se-Young Kim, Seongnam-si (KR); Sang-Kuk Woo, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 302 days.

(21) Appl. No.: 13/740,388

(22) Filed: Jan. 14, 2013

(65) Prior Publication Data
US 2013/0266883 A1   Oct. 10, 2013

(30) Foreign Application Priority Data
Apr. 6, 2012   (KR) .................. 10-2012-0035868

(51) Int. Cl.
H01M 8/04   (2006.01)
H01M 8/24   (2006.01)

(52) U.S. Cl.
CPC ...... *H01M 8/04089* (2013.01); *H01M 8/04007* (2013.01); *H01M 8/243* (2013.01); *Y02E 60/50* (2013.01)

(58) Field of Classification Search
USPC .......................... 429/456, 496–497
See application file for complete search history.

(56) References Cited

U.S. PATENT DOCUMENTS

| | | | |
|---|---|---|---|
| 6,936,367 B2 * | 8/2005 | Sarkar et al. ................. | 429/423 |
| 7,351,487 B2 | 4/2008 | Yamashita et al. | |
| 2001/0044043 A1 * | 11/2001 | Badding et al. ................. | 429/40 |
| 2003/0175574 A1 * | 9/2003 | Dohle et al. .................... | 429/35 |
| 2005/0095483 A1 * | 5/2005 | Song et al. ...................... | 429/31 |

FOREIGN PATENT DOCUMENTS

| | | |
|---|---|---|
| JP | 2009-099267 | 5/2009 |
| KR | 1020050021027 A | 3/2005 |
| KR | 2012-0012262 | 2/2012 |
| WO | WO 2012/015113 | 2/2012 |

* cited by examiner

*Primary Examiner* — Ula C Ruddock
*Assistant Examiner* — Osei Amponsah
(74) *Attorney, Agent, or Firm* — Hamre, Schumann, Mueller & Larson, P.C.

(57) ABSTRACT

Disclosed herein is a flat-tubular solid oxide cell stack in which the pathway of chemical reactions is long and the temperature and flow rate of feed gas are maintained at uniform levels, thus the efficiency of electrical energy generation is increased when the cell stack is used as a fuel cell, and the purity of generated gas (hydrogen) is increased when the cell stack is used as a high-temperature electrolyzer.

1 Claim, 11 Drawing Sheets

FLAT-TUBULAR SOLID OXIDE CELL STACK

CROSS-REFERENCE TO RELATED APPLICATION

This application claims priority to Korean Patent Application No. KR 10-2012-0035868, filed on Apr. 6, 2012, which is incorporated herein by reference in its entirety.

BACKGROUND OF THE INVENTION

1. Field of the Invention

Exemplary embodiments of the present invention relate to a flat-tubular solid oxide cell stack, and more particularly to a flat-tubular solid oxide cell stack in which the pathway of chemical reactions is long and the changes in the temperature and flow rate of feed gas are minimized, and thus the efficiency of electrical energy generation is increased when the cell stack is used as a fuel cell, and the purity of generated gas (hydrogen) is increased when the cell stack is used as a high-temperature electrolyzer.

2. Description of Related Art

Generally, fuel cells use high-efficiency clean electricity generation technology in which oxygen in the air and hydrogen contained in a hydrocarbon material, such as natural gas, coal gas, methanol, etc., are directly converted into electric energy by an electrochemical reaction. According to the kind of electrolyte, fuel cells are classified into an alkali fuel cell, a phosphoric acid fuel cell, a molten carbonate fuel cell, a solid oxide fuel cell and a polymer electrolyte fuel cell.

The solid oxide fuel cell (SOFC), all components of which are solid, is operated at a high temperature of about 600 to 1000° C. Among several types of existing fuel cells, the SOFC has the highest efficiency and the lowest pollution rate. In addition, the SOFC has other several advantages in that a fuel reformer is not required, and it can be easily used in a combined electricity generation system. Further, the SOFC can be used as a high-temperature solid oxide electrolyzer cell (SOEC) by performing an inverse electrochemical reaction.

Electrochemical reaction devices, such as the solid oxide fuel cell, the high-temperature electrolyzer cell, etc., are generally classified into a flat type and a cylindrical type, according to the shape. The flat type electrochemistry reaction device has an advantage of high power density (output) but is disadvantageous in that the area of a portion to be sealed for gas is comparatively large, there is a thermal shock that occurs because of the difference in coefficients of expansion between components when stacked, and it is difficult to greatly increase the size thereof. The cylindrical type electrochemical reaction device has relatively high resistance to heat stress and relatively high mechanical strength and can have a large size because it is manufactured by extrusion. However, the cylindrical type is disadvantageous in that power density (output) is low.

Flat-tubular and cylindrical electrochemical reaction devices (for example, flat-tubular solid oxide fuel cells) that combine the advantages of the flat type electrochemical reaction device and the cylindrical type electrochemistry reaction device are disclosed in Korean Patent Laid-open Publication No. 2005-0021027 and U.S. Pat. No. 7,351,487. Such flat-tubular electrochemical reaction devices have a stack structure in which cells are stacked one on top of another to enhance the output. However, such devices have a problem in that, when cells are stacked to minimize the sealing area and a first gas that flows in the stacked cells flows through a first gas flow channel in a zigzag manner, the temperature and concentration of the first gas at the inlet end and the outlet end change, and thus efficient electricity generation cannot be achieved.

PRIOR ART DOCUMENTS

Patent Documents

Patent Document 1: KR 2005-0021027 A
Patent Document 2: U.S. Pat. No. 7,351,487 B

SUMMARY OF THE INVENTION

An embodiment of the present invention is to solve the above-described problems occurring in the prior art and to provide a flat-tubular solid oxide cell stack in which the stress of cell stacking is minimized, sealing portions are minimized, the pathway of chemical reactions is long and the changes in the temperature and flow rate of feed gas are minimized, and thus the efficiency of electrical energy generation is increased when the cell stack is used as a fuel cell, and the purity of generated gas (hydrogen) is increased when the cell stack is used as a high-temperature electrolyzer.

In accordance with an embodiment of the present invention, a flat-tubular solid oxide cell stack includes a plurality of unit cells, each including: an anode (negative electrode) including a first gas flow channel therein; a cathode (positive electrode) deposited on an electrolyte layer coated on the anode; and an interconnection material deposited opposite the surface having the cathode deposited thereon.

In accordance with another embodiment of the present invention, the unit cell is selected from the group consisting of: (a) a unit cell in which connection holes passing through both sides of the cell, respectively, are formed at portions near both ends of the first-gas flow channel in the thickness direction of the cell and are formed in directions opposite to each other so as to be the first-gas flow channels of the cells adjacent thereto; (b1) a unit cell in which a hole passing through both sides of the cell is formed at a portion near one end of the first-gas flow channel in the thickness direction of the cell, and a connection hole passing through the upper side of the cell is formed at a portion near the other end in the thickness direction of the cell, the connection holes being connected with the first-gas flow channels of the cells adjacent thereto; (b2) a unit cell in which a hole passing through both sides of the cell is formed at a portion near one end of the first-gas flow channel in the thickness direction of the cell, and a connection hole passing through the lower side of the cell is formed at a portion near the other end in the thickness direction of the cell, the connection holes being connected with the first-gas flow channels of the cells adjacent thereto; and (c) a unit cell in which connection holes passing through both sides of the cell are formed at portions near both ends of the cell in the thickness direction of the cell so as to be connected with the first-gas flow channels of the cells adjacent thereto.

In accordance with still another embodiment of the present invention, the flat-tubular solid oxide cell stack includes at least three unit cells which are continuously connected to each other by the connection holes in the thickness direction.

In accordance with still another embodiment of the present invention, each of the lowest and uppermost unit cells among the unit cells of the flat-tubular solid oxide cell stack is unit cell (a).

In accordance with still another embodiment of the present invention, a sealing unit having a ring-shaped sealing material is formed outside the connection holes, which communicate with the first-gas flow channels of the unit cells of the flat-tubular solid oxide cell stack, so as to seal gas.

DESCRIPTION OF SPECIFIC EMBODIMENTS

Figure 1:
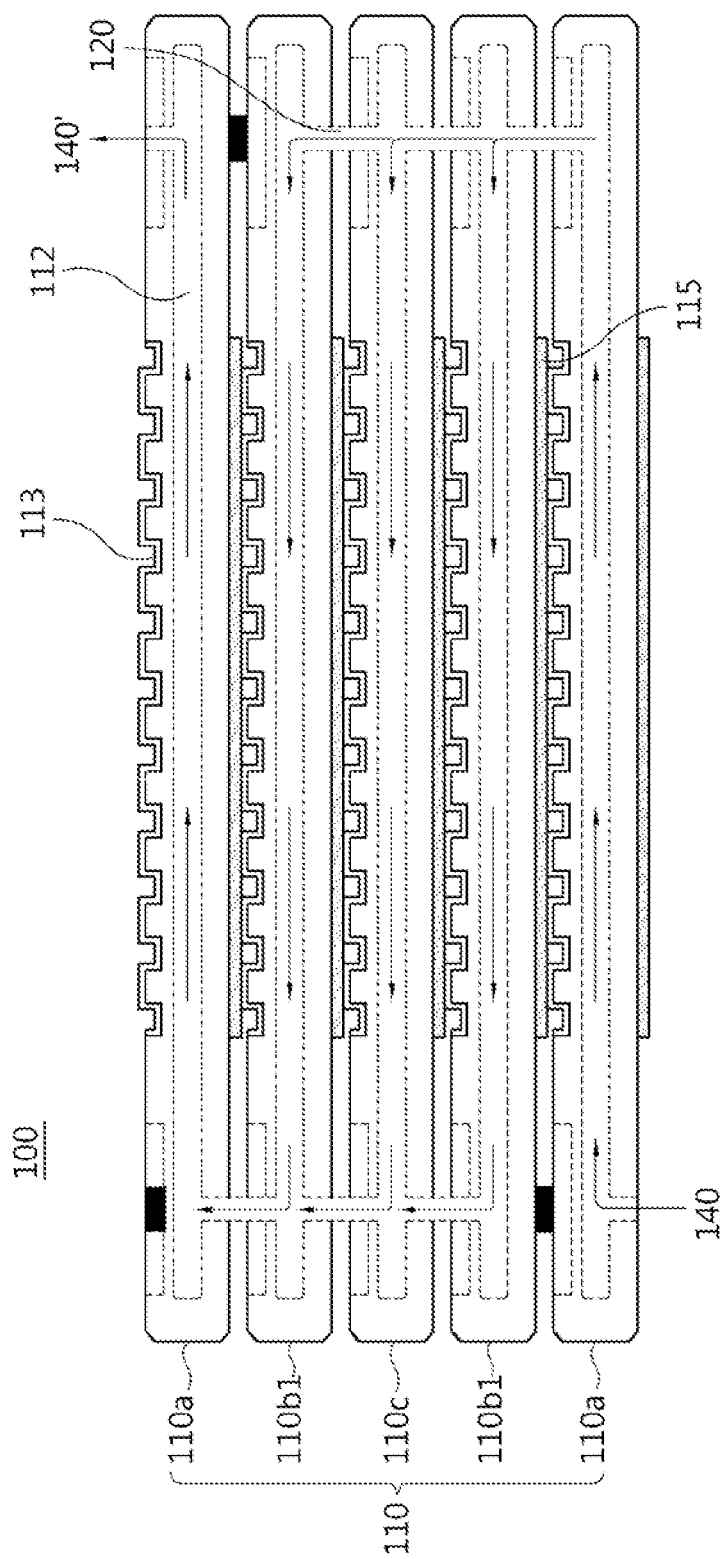
FIG. 1 shows the configuration of a flat-tubular solid oxide cell stack according to the present invention.

Exemplary embodiments of the present invention will be described below in greater detail with reference to the accompanying drawings. The present invention may, however, be embodied in different forms, and should not be construed as being limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The drawings are not necessarily to scale, and in some instances, proportions may have been exaggerated in order to clearly illustrate features of the embodiments. When a first layer is referred to as being "on" a second layer or "on" a substrate, it not only refers to the case where the first layer is formed directly on the second layer or the substrate, but also the case where a third layer exists between the first layer and the second layer or the substrate.

Hereinafter, embodiments of the present invention will be described in detail with reference to the accompanying drawings.

A flat-tubular solid oxide cell stack according to the present invention can be used as a fuel cell or a high-temperature electrolyzer cell. Hereinafter, a flat-tubular solid oxide cell stack which is used as a fuel cell will be described.

FIG. 1 shows the configuration of a flat-tubular solid oxide cell stack according to a first embodiment of the present invention. As shown therein, a flat-tubular solid oxide cell stack 100 for a fuel cell has a structure in which a plurality of unit cells 110 are stacked vertically, and the uppermost unit cell and the lowest unit cell are provided with first-gas inlet and outlet manifolds (a first-gas inlet manifold 140 and a first-gas outlet manifold 140') through which first gas (hydrogen or hydrocarbon) passes.

The number of the plurality of unit cells which are stacked is at least three, preferably at least four.

More specifically, the plurality of unit cells 110 have a first-gas flow channel 112, both lengthwise ends of which are closed. In the unit cells 110, the first-gas flow channel 112 along which a first gas flows is formed along the lengthwise direction, and on one outside of each of the unit cells 110, a plurality of second-gas flow channels 113 along which a second gas (air or oxygen) flows in a direction perpendicular to the first-gas flow channel 112 (widthwise direction). Further, a connection hole 120 is formed adjacent to the end of the first-gas flow channel 112 such that the first gas can flow continuously between the plurality of unit cells 110. In addition, a ceramic conductor 115 is coated on the lower surface of each of the unit cells 110, which is opposite the surface having the second-gas flow channel 113 formed thereon, such that the unit cells 110 are electrically connected to each other.

FIG. 2 more specifically shows various unit cells which are used in the present invention.

Figure 2A:
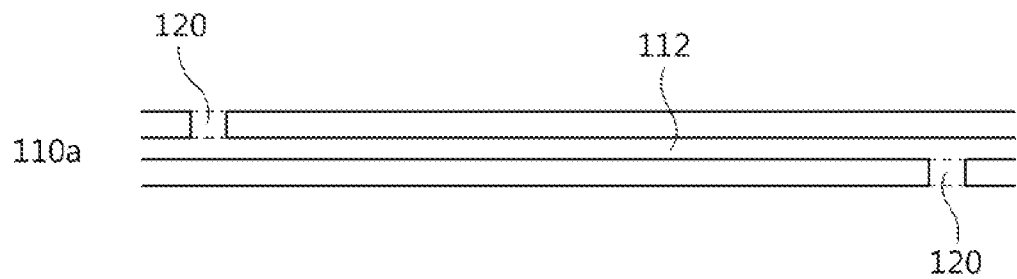
FIG. 2A, FIG. 2B, FIG. 2C, FIG. 2D show unit cells, which are included in a cell stack.
Figure 2B:
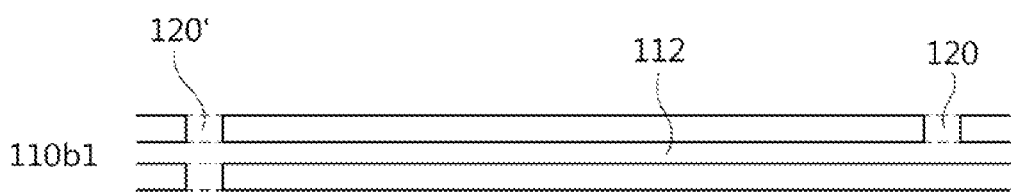
Figure 2C:
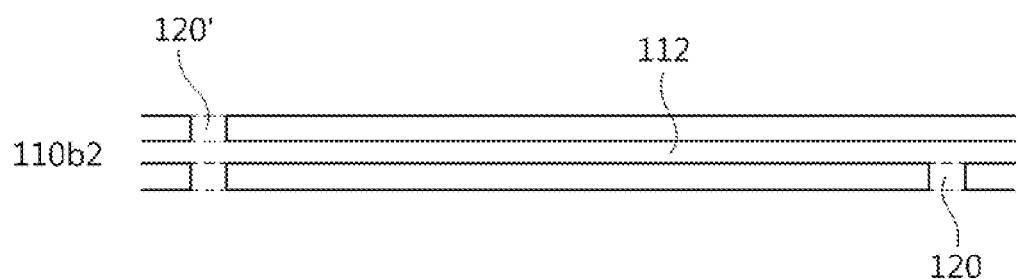
Figure 2D:
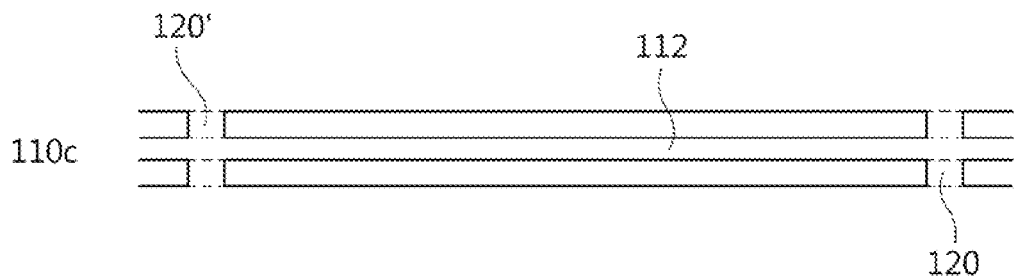

As shown in FIG. 2, the unit cell is selected from among a unit cell (FIG. 2A), a unit cell (FIG. 2B), a unit cell (FIG. 2C) and a unit cell (FIG. 2D).

In the unit cell 110a (FIG. 2A), connection holes 120 are formed at portions near both ends of the first-gas flow channel 112 in the thickness direction of the cell such that they pass through both sides of the cell, respectively. The connection holes 120 are formed in directions to each other so as to be connected with the first-gas flow channels of the cells adjacent thereto. In the unit cell 110b1 (FIG. 2B), connections 120' are formed at a portion near one end of the first-gas flow channel 112 in the thickness direction of the cell such that they pass through both sides of the cell, and a connection hole 120 is formed at a portion near the other end of the cell in the thickness direction such that it passes through the upper side of the cell. The connection holes 120 and 120' are formed so as to be connected with the first-gas flow channels of the cells adjacent thereto. In the unit cell 110b2 (FIG. 2C), connections 120' are formed at a portion near one end of the first-gas flow channel 112 in the thickness direction of the cell such that they pass through both sides of the cell, and a connection hole 120 is formed at a portion near the other end of the cell in the thickness direction such that it passes through the lower side of the cell. In the unit cell 110c (FIG. 2D), connections 120' are formed at portions near both ends of the first-gas flow channel in the thickness of the cell so as to be connected with the first-gas flow channels of the cells adjacent thereto. Herein, the unit cells 110a to 110c are not limited to the configurations shown in FIG. 2, but include even configurations appearing when the configurations shown in FIG. 2 are symmetrized horizontally.

Figure 4A:
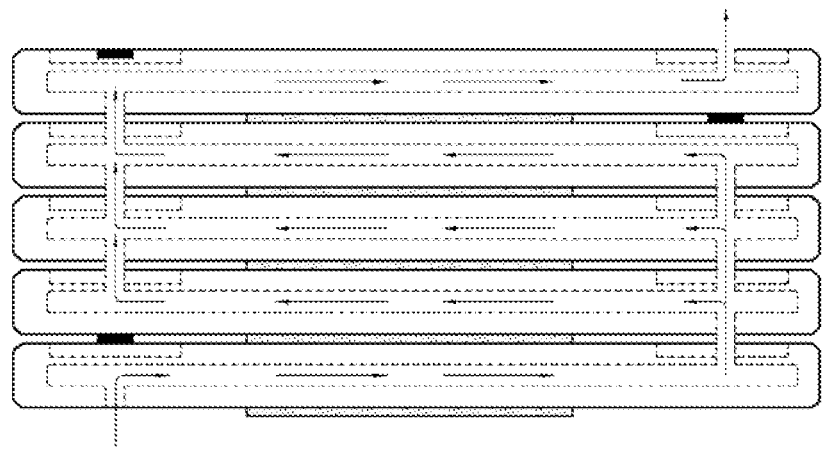
FIG. 4A, FIG. 4B, and FIG. 4C show examples of the flow of a first gas in a flat-tubular solid oxide cell stack according to the present invention.
Figure 4B:
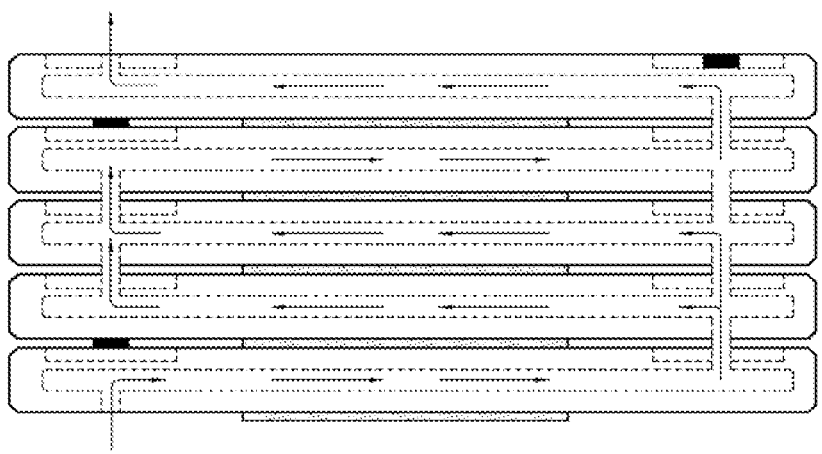
Figure 4C:
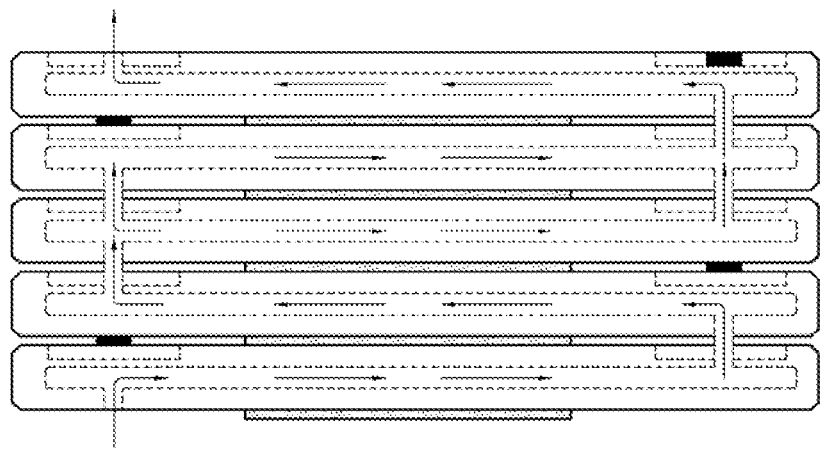

The flow of the first gas in a cell stack comprising one or more of the unit cells 110a to 110c may vary depending on the selection of the unit cell and the order of stacking of the cells. FIGS. 4a to 4c specifically show examples of various changes in the flow of the first gas in the stack of the cells.

When a cell stack consists of a stack of the unit cells 110a to 110c, it preferably comprises at least 3 unit cells which are continuously connected to each other by the connection holes 120 in the thickness direction. When at least 3 unit cells 110 among the plurality of unit cells 110 are continuously connected to each other by the connection holes 120, the first gas will flow in at least two adjacent unit cells 110 in the same direction, and thus it is possible to minimize changes in the temperature and concentration of the first gas, which occur when the first gas flows in a zigzag manner.

When the unit cells are stacked, each of the lowest and uppermost unit cells is preferably the unit cell 110a. In the case in which the unit cell 110a constitutes each of the lowest and uppermost unit cells, as shown in FIG. 1, a first-gas inlet manifold 140 can be provided at a portion through which the first gas (hydrogen or hydrocarbon) is introduced, and a first-gas outlet manifold 140' can be provided at a portion through which the first gas is discharged.

The plurality of second-gas flow channels 113 are formed at the lengthwise intermediate portion of the unit cell 110 in the widthwise direction of the unit cell 110.

Figure 3A:
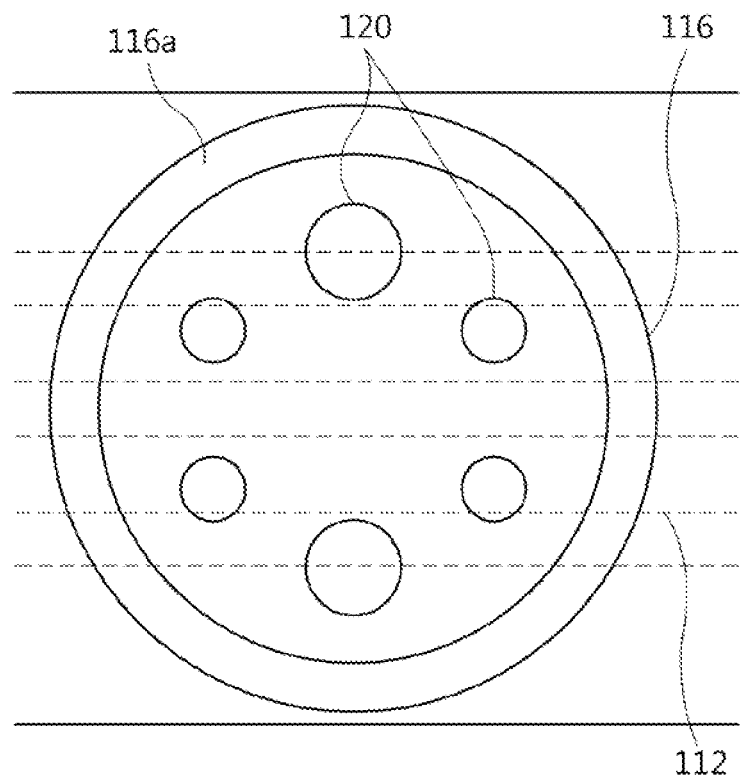
FIG. 3A and FIG. 3B show a sealing unit included in a unit cell.
Figure 3B:
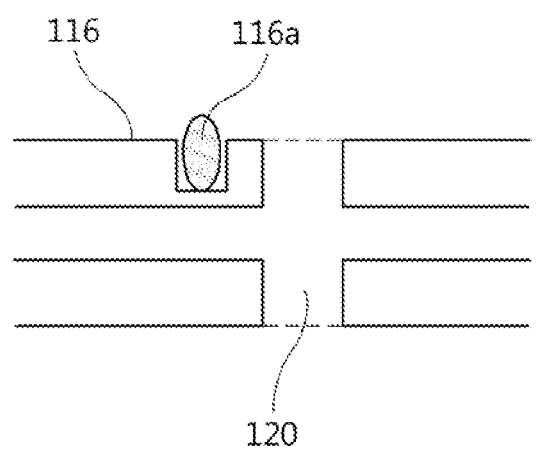

As shown in FIG. 3A and FIG. 3B, the plurality of connection holes 120 are annularly arranged in a circumferential direction to connect the first-gas flow channel to other unit cells adjacent thereto. Outside the plurality of connection holes 120 arranged in a circumferential direction, a sealing unit 116 having a ring-shaped sealing material 116a inserted therein is formed so as to seal gas.

In the case in which the flat-tubular solid oxide cell stack according to the first embodiment of the present invention as described above is used as a fuel cell, as shown in FIG. 1, hydrogen (or hydrocarbon) is introduced into the first-gas flow channel of the lowest unit cell through the first-gas inlet manifold 140 and flows along the inside of the first-gas flow channels of the plurality of the unit cells in the same direction as indicated by the arrows, after which the flows of the first gas are combined with each other in the first-gas flow channel of the uppermost unit cell, and then discharged through the first-gas outlet manifold 140'. In this flow pathway, the first gas (hydrogen or hydrocarbon) reacts with air (oxygen) flowing through the second-gas flow channel of the unit cells 110 to generate electricity, and is discharged together with generated water through the first-gas outlet manifold 140'. The generated electricity is collected through the ceramic conductor 115.

In the case in which the flat-tubular solid oxide cell stack is used as a high temperature electrolyzer cell, steam is introduced through the first-gas inlet manifold 140 and subjected to an electrochemical reaction (reverse to a fuel cell reaction) to generate hydrogen, and it is discharged through the first-gas outlet manifold 140'.

Although the present invention has been described with reference to the embodiments shown in the drawings, these embodiments are illustrative only and any person skilled in the art will appreciate that other modified and equivalent embodiments are possible and the technical protection scope of the present invention should be defined by the technical sprit of the appended claims.

EXAMPLE AND COMPARATIVE EXAMPLE

Test for Efficiency of Fuel Cell

Example 1

Manufacture of Cell Stack

Figure 5A:
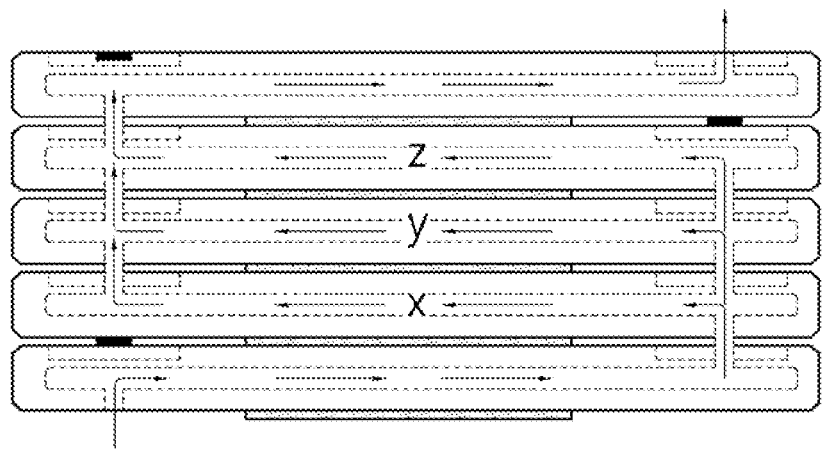
FIG. 5A and FIG. 5B show the configuration of each of cell stacks manufactured in Example 1 of the present invention and Comparative Example 1.

Using a ceramic extrusion molding machine, an anode was molded such that a first-gas flow channel was formed therein, and both ends thereof were sealed. Then, connection holes for connecting the first-gas flow channels of unit cells to each other were formed at portions near both ends of the dried molded body in the thickness direction of the cells. As a result, the following unit cells were manufactured: a unit cell 110a in which the connection holes passing through both sides of the cell, respectively, are formed in directions opposite to each other so as to be connected with the first-gas flow channels of the cells adjacent thereto; unit cells (110b1 and 110b2) in which a connection hole passing through both sides of the cell is formed at a portion near one end of the cell in the thickness direction of the cell, and a connection hole passing through any one side of the cell is formed at a portion near the other end of the cell in the thickness direction, so that the connection holes are connected with the first-gas flow channels of the cells adjacent thereto; and a unit cell 110c in which connection holes passing through both sides of the cell are formed at portions near both ends of the cell so as to be connected with the first-gas flow channels of the cells adjacent thereto. Then, as shown in FIG. 1, a cell stack was manufactured, in which the unit cell 110a constitutes each of the lowest and uppermost cell units between which the unit cell 110(b1), the unit cell 110b2 and the unit cell 110c are interposed. Then, the surface of the anode was coated with an electrolyte layer, and then heat treatment was carried out at a temperature of 1350 to 1400° C. so that an interconnection material and the electrolyte layer became dense. Then, a cathode was coated on the electrolyte layer opposite the surface having the interconnection material formed thereon and was heat-treated at a temperature of 900 to 1200° C., thereby manufacturing a flat-tubular solid oxide cell stack as shown in FIG. 5A.

Comparative Example 1

Manufacture of Cell Stack

Figure 5B:
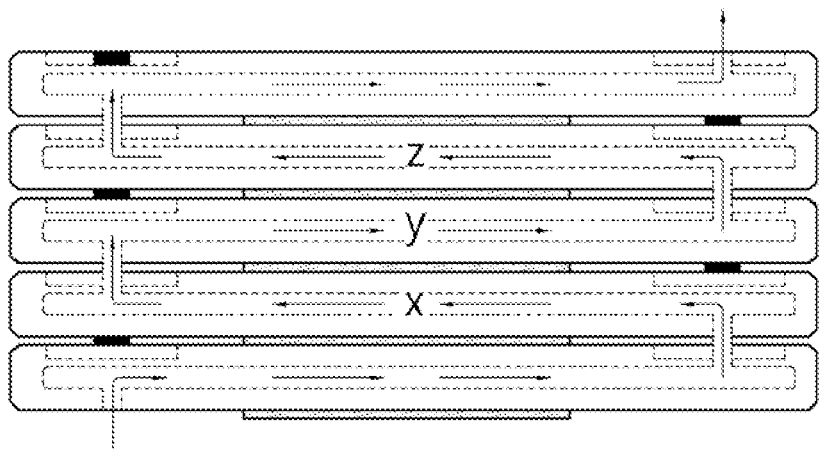
Figure 6:
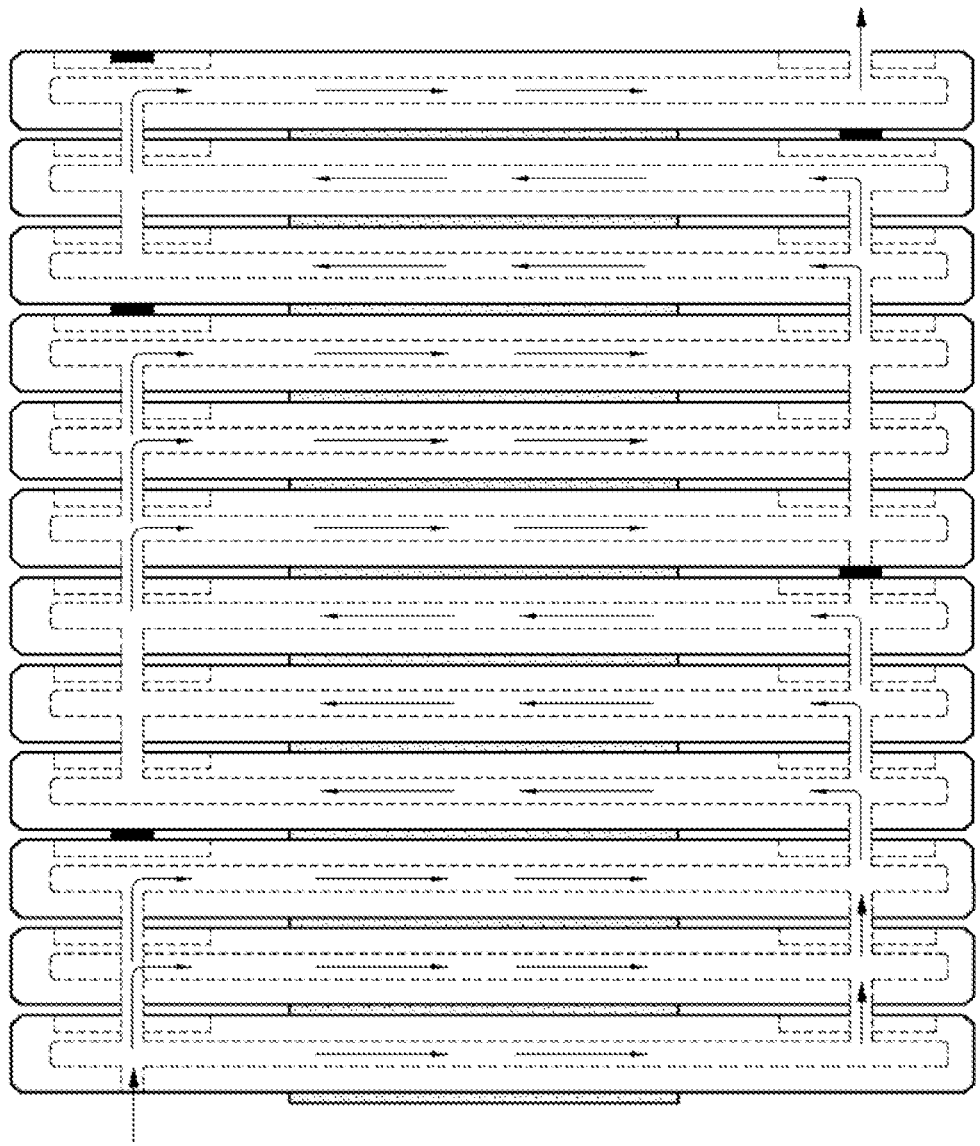
FIG. 6 shows examples of the flow of a first gas in a flat-tubular solid oxide cell stack according to the present invention.
Figure 7:
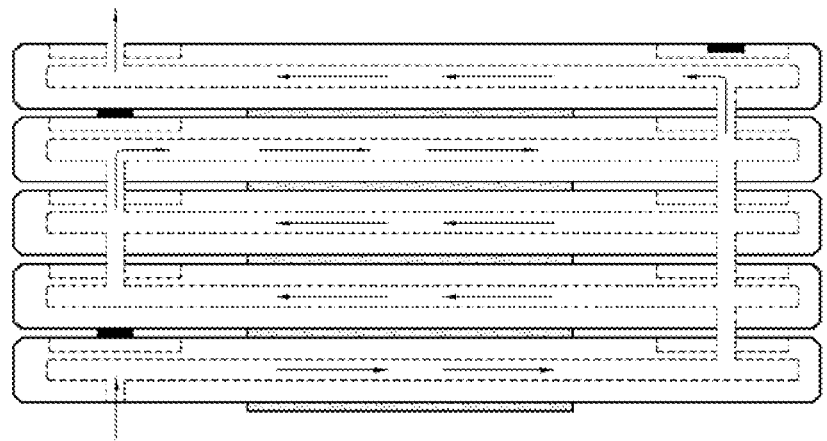
FIG. 7 shows examples of the flow of a first gas in a flat-tubular solid oxide cell stack according to the present invention.
Figure 8:
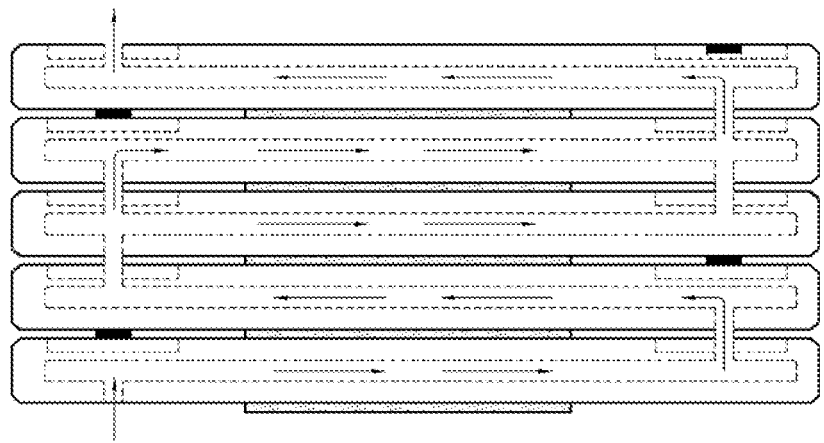
FIG. 8 shows examples of the flow of a first gas in a flat-tubular solid oxide cell stack according to the present invention.
Figure 9:
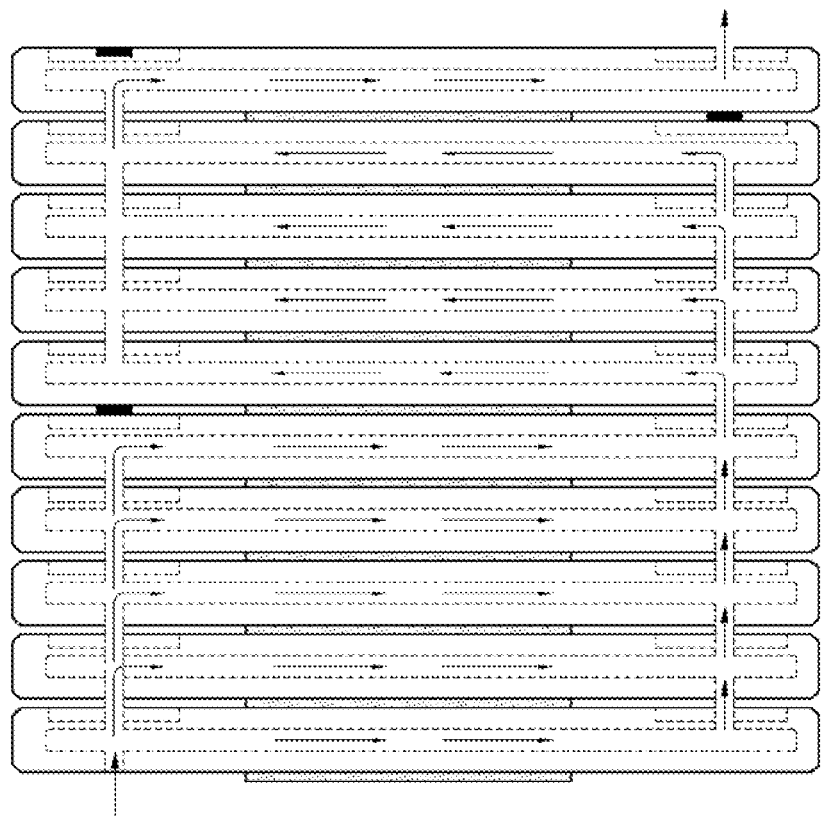
FIG. 9 shows examples of the flow of a first gas in a flat-tubular solid oxide cell stack according to the present invention.
Figure 10:
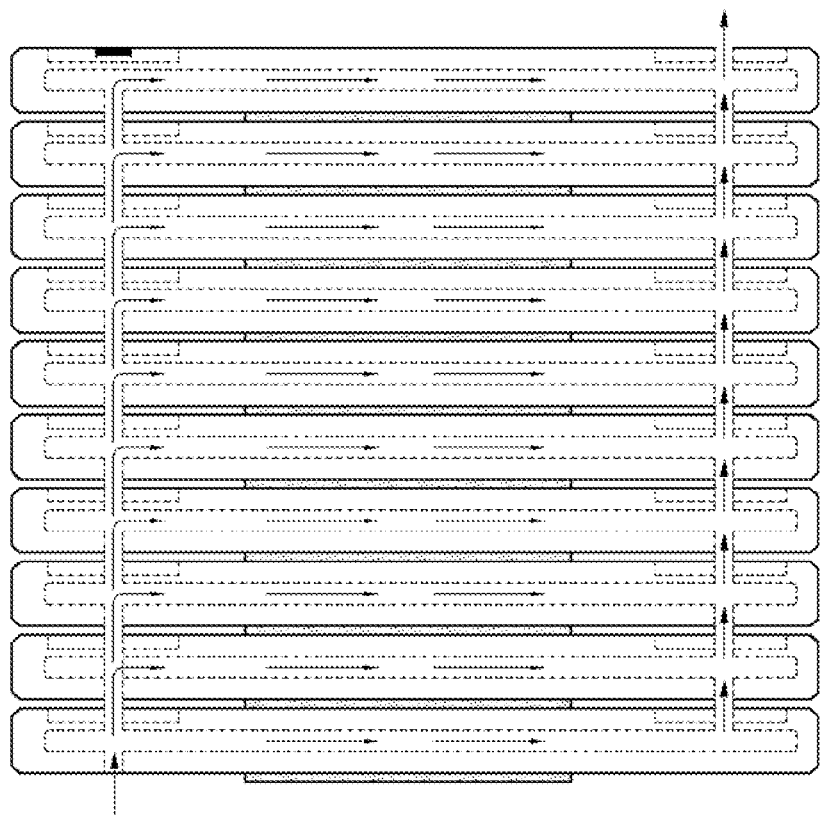
FIG. 10 shows examples of the flow of a first gas in a flat-tubular solid oxide cell stack according to the present invention.

A flat-tubular solid oxide cell stack as shown in FIG. 5B was manufactured in the same manner as Example 1, except that connection holes passing only any one side of unit cells were formed at portions near both ends of the first-gas flow channels such that the first gas would flow in a zigzag manner in the lengthwise direction of the unit cells and except that the connection holes were formed in directions to each other so as to be connected with the first-gas flow channels of the cells adjacent thereto.

Test Example 1

Measurement of Change in Flow Rate

A first gas (nitrogen:hydrogen=2:1) having a temperature of 800° C. was introduced into each of the flat-tubular solid oxide cell stacks manufactured in Example 1 and Comparative Example 1, and then the flow rate of the first gas was measured at the point of introduction, 3 intermediate points (x, y and z in FIG. 5) and the point of discharge. The results of the measurement are shown in Table 1 below.

TABLE 1

| | Average flow rate (m/s) | |
|---|---|---|
| | Example 1 | Comparative Example 1 |
| Point of introduction | 0.7 | 0.7 |
| Point of x | 0.55 | 0.25 |
| Point of y | 0.60 | 0.51 |
| Point of z | 0.74 | 0.75 |
| Point of discharge | 0.82 | 1.0 |

Test Example 2

Efficiency of Fuel Cell

Using the flat-tubular solid oxide cell stacks manufactured in Example 1 and Comparative Example 1, fuel cells were manufactured and the efficiencies thereof were compared to each other. The efficiencies were calculated by dividing the amount of heat of generated hydrogen by introduced electrical energy as described in "International Journal of Hydrogen Energy 37 (2012) 78-83". The results of the calculation are shown in Table 2 below.

TABLE 2

|  | Example 1 | Comparative Example 1 |
| --- | --- | --- |
| Faradic efficiency | 97% | 63% |

As can be seen in Table 1 regarding Test Example 1, in the flat-tubular solid oxide cell stack of Example 1, the difference in flow rate between the points was small, whereas, in the flat-tubular solid oxide cell stack of Comparative Example 1, the difference in flow raw was very severe. When the flow rate of the first gas is small, there are advantages in that, because the electrochemical reaction rate of the gas is uniform, the reaction performance and durability characteristics of the cell are excellent. On the other hand, when the difference in the flow rate of the first gas is severe, there are problems in that the reaction performance and durability characteristics of the cell are deteriorated.

As can be seen in Table 2 regarding Test Example 2, in the flat-tubular solid oxide cell stack of Example 1, the ratio of the amount of heat of hydrogen relative to introduced electrical energy was high, suggesting the efficiency of the cell stack is high.

As described above, in the flat-tubular solid oxide cell stack according to the present invention, sealing portions of complex shapes at manifold portions are minimized without a metallic connection material, the stress of cell stacking can be minimized and the number of manifolds can be reduced and the structure of the cell stack can be simplified. In addition, because the first gas flows along the lengthwise direction of the unit cells in the same direction, the pathway of chemical reactions in the unit cells is increased, and the first gas does not flow only in a zigzag manner and flows at a uniform flow rate throughout the cell stack to minimize changes in the temperature and concentration of the first gas. Thus, when the cell stack is used as a fuel cell, the efficiency of electrical energy generation is increased, and when it is used as a high-temperature electrolyzer cell, the purity of generated gas (hydrogen) is increased.

What is claimed is:

1. A flat-tubular solid oxide cell stack, comprising:
at least three unit cells, each of the unit cells comprising:
an anode including a first gas flow channel therein;
a cathode deposited on an electrolyte layer coated on the anode; and
an interconnection material deposited opposite a surface having the cathode deposited thereon,
wherein the first-gas flow channel of each of the three unit cells direct flow of first gas along the same direction, and
wherein the three unit cells are continuously connected to each other by connection holes in a thickness direction, and the connection holes direct the flow of the first-gas of the three unit cells so that the first-gas of the three unit cells combine together in the first gas flow channel of an uppermost one of the three unit cells,
wherein each of the unit cells is selected from the group consisting of:
(a) a unit cell in which connection holes passing through both sides of the cell, respectively, are formed at portions near both ends of the first-gas flow channel in the thickness direction of the cell and are formed in directions opposite to each other so as to be the first-gas flow channels of the cells adjacent thereto;
(b1) a unit cell in which a hole passing through both sides of the cell is formed at a portion near one end of the first-gas flow channel in the thickness direction of the cell, and a connection hole passing through the upper side of the cell is formed at a portion near the other end in the thickness direction of the cell, the connection holes being connected with the first-gas flow channels of the cells adjacent thereto;
(b2) a unit cell in which a hole passing through both sides of the cell is formed at a portion near one end of the first-gas flow channel in the thickness direction of the cell, and a connection hole passing through the lower side of the cell is formed at a portion near the other end in the thickness direction of the cell, the connection holes being connected with the first-gas flow channels of the cells adjacent thereto; and
(c) a unit cell in which connection holes passing through both sides of the cell are formed at portions near both ends of the cell in the thickness direction of the cell so as to be connected with the first-gas flow channels of the cells adjacent thereto,
wherein each of the lowest and uppermost unit cells among the unit cells of the cell stack is unit cell (a) and the lowest and uppermost unit cells have first-gas inlet and outlet manifolds through which the first gas passes,
a sealing unit having a ring-shaped sealing material is formed outside of the connection holes, which communicate with the first-gas flow channels of the unit cells of the cell stack, so as to seal gas,
a plurality of second-gas flow channels along which second gas flows in a direction perpendicular to the first-gas flow channel are formed on one outside of each of the unit cells, and
a ceramic conductor is coated on the lower surface of each of the unit cells, which is opposite the surface having the second-gas flow channel.

* * * * *